(12) United States Patent
Yang et al.

(10) Patent No.: US 7,304,974 B2
(45) Date of Patent: Dec. 4, 2007

(54) SUPPORTING A NETWORK BEHIND A WIRELESS STATION

(75) Inventors: Minglei Yang, Fremont, CA (US); Wen-lin Tsao, Fremont, CA (US); Andrew Au, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/846,089

(22) Filed: May 14, 2004

(65) Prior Publication Data

US 2005/0254452 A1    Nov. 17, 2005

(51) Int. Cl.
*H04Q 7/24*    (2006.01)
*H04L 12/28*    (2006.01)
*H04J 3/16*    (2006.01)

(52) U.S. Cl. .................. 370/338; 370/352; 370/401; 370/466

(58) Field of Classification Search ............... 370/329, 370/349, 409, 437, 465, 466, 469, 335–338, 370/352–356, 401, 467, 392; 709/200–238, 709/245, 246, 249; 710/120
See application file for complete search history.

(56) References Cited

U.S. PATENT DOCUMENTS

| | | | |
|---|---|---|---|
| 5,696,765 A * | 12/1997 | Safadi | 370/436 |
| 5,970,059 A | 10/1999 | Ahopelto et al. | 370/338 |
| 6,480,717 B1 | 11/2002 | Ramaswamy | 455/445 |
| 6,501,957 B2 | 12/2002 | Muhonen et al. | 455/503 |
| 6,687,252 B1 * | 2/2004 | Bertrand et al. | 370/401 |
| 6,711,147 B1 * | 3/2004 | Barnes et al. | 370/338 |
| 6,950,862 B1 * | 9/2005 | Puthiyandyil et al. | 709/220 |
| 6,950,892 B2 * | 9/2005 | Bell et al. | 710/120 |
| 2001/0043577 A1 * | 11/2001 | Barany et al. | 370/328 |
| 2003/0053448 A1 * | 3/2003 | Craig et al. | 370/353 |
| 2003/0227892 A1 * | 12/2003 | Cabana | 370/338 |

OTHER PUBLICATIONS

G. Camarillo, Ed. Ericsson, W. Marshall, Ed. AT&T, J. Rosenberg, "Integration of Resource Management and Session Initiation Protocol (SIP)," Network Working Group, RFC 3312, http://www.faqs.org/rfcs/rfc3312.html, 21 pgs, Oct. 2002.

W. Marshall, Ed. AT&T, "Private Session Initiation Protocol (SIP) Extensions for Media Authorization," Network Working Group, RFC 3313, http://www.faqs.org/rfcs/rfc3313.html, 12 pgs, Jan. 2003.

Meyer, et al., "MPLS Traffic Engineering Soft Preemption", http:www.ietf.org/proceedings/03jul/1-D/draft-ietf-mpls-soft-preemption-00.txt, 9 pgs, Feb. 2003.

* cited by examiner

*Primary Examiner*—Afsar Qureshi
(74) *Attorney, Agent, or Firm*—Baker Botts L.L.P.

(57) ABSTRACT

An apparatus for supporting a network behind a wireless station includes a gateway that can receive from a wireless station a request for a communications session. The gateway can determine whether to authenticate the communications session, and, in response to determining to authenticate the communications session, request from a server network addresses for network devices behind the wireless station. The gateway can receive the requested network addresses from the server, associate the received network addresses with the wireless station, and establish the communications session.

40 Claims, 4 Drawing Sheets

| USER ATTRIBUTE TABLE ||
|---|---|
| USER | ATTRIBUTES |
| 1.1.1.1 | |
| 6.7.8.9 | 4.4.4.1 |
| 4.3.2.1 | 7.3.7.3; 7.3.7.4; 7.3.7.5 |
| 9.9.7.8 | 2.6.8.1; 4.7.3.5 |

| TUNNEL SECURITY TABLE ||
|---|---|
| TUNNEL ID | ADDRESSES |
| 24 | 1.1.1.1 |
| 37 | 6.7.8.9; 4.4.4.1 |
| 56 | 9.9.7.8; 2.6.8.1; 4.7.3.5 |
| 99 | 9.9.7.8; 2.6.8.1; 4.7.3.5 |

| ROUTING TABLE ||
|---|---|
| INCLUDED ADDRESS | USABLE ADDRESS |
| 1.1.1.1 | 1.1.1.1 |
| 4.4.4.1 | 6.7.8.9 |
| 7.3.7.3 | 4.3.2.1 |
| 7.3.7.4 | 4.3.2.1 |
| 7.3.7.5 | 4.3.2.1 |
| 2.6.8.1 | 9.9.7.8 |
| 4.7.3.5 | 9.9.7.8 |
| 6.7.8.9 | 6.7.8.9 |
| 4.3.2.1 | 4.3.2.1 |
| 9.9.7.8 | 9.9.7.8 |

| MAPPING TABLE ||
|---|---|
| TUNNEL ID | MAPPED ID |
| 14 | 77 |
| 62 | 41 |
| 83 | 43 |
| 85 | 8 |
| 77 | 14 |
| 41 | 62 |
| 43 | 83 |
| 8 | 85 |

*FIG. 4d*

SUPPORTING A NETWORK BEHIND A WIRELESS STATION

TECHNICAL FIELD OF THE INVENTION

The present invention relates in general to networking and, more particularly, to supporting a network behind a wireless station.

BACKGROUND OF THE INVENTION

Networking technologies have become increasingly important in today's society. One networking technology, general packet radio service (GPRS), allows data packets to be communicated to wireless stations. In GPRS networks, any number of data services may be provided to one or more wireless stations. As wireless stations become increasingly sophisticated and integrated into complex networks, however, protocols and network equipment must evolve to support the increased complexity. Current GPRS networks are ill equipped to handle the increased complexity associated with integrating networks behind wireless stations. The ability to support these integrated networks thus presents a significant challenge to network administrators, component manufacturers, and system designers.

SUMMARY OF THE INVENTION

From the foregoing, it may be appreciated by those skilled in the art that a need has arisen to support a network behind a wireless station. In accordance with the present invention, an apparatus, system, and method for supporting a network behind a wireless station are provided that substantially eliminate or greatly reduce disadvantages and problems associated with conventional networking techniques.

According to one embodiment of the present invention, an apparatus for supporting a network behind a wireless station includes a gateway that can receive from a wireless station a request for a communications session. The gateway can determine whether to authenticate the communications session, and, in response to determining to authenticate the communications session, request from a server network addresses for network devices behind the wireless station. The gateway can receive the requested network addresses from the server, associate the received network addresses with the wireless station, and establish the communications session.

Certain embodiments of the present invention may provide one or more technical advantages. For example, one technical advantage is the ability to route data packets intended for or sent by network devices behind wireless stations. Another technical advantage is to be able to consolidate information related to networks behind wireless stations for dynamic use by network nodes. These techniques may increase security related to communications to or from wireless stations. These techniques may also reduce the need for increasingly intelligent wireless stations and gateways. Furthermore, these techniques may give operators added control over the provision of enhanced services to wireless stations. Other technical advantages may be readily apparent to those skilled in the art from the following figures, description, and claims. Moreover, while specific advantages have been enumerated, various embodiments may include all, some, or none of the enumerated advantages.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which.

DETAILED DESCRIPTION OF THE INVENTION

Figure 1:
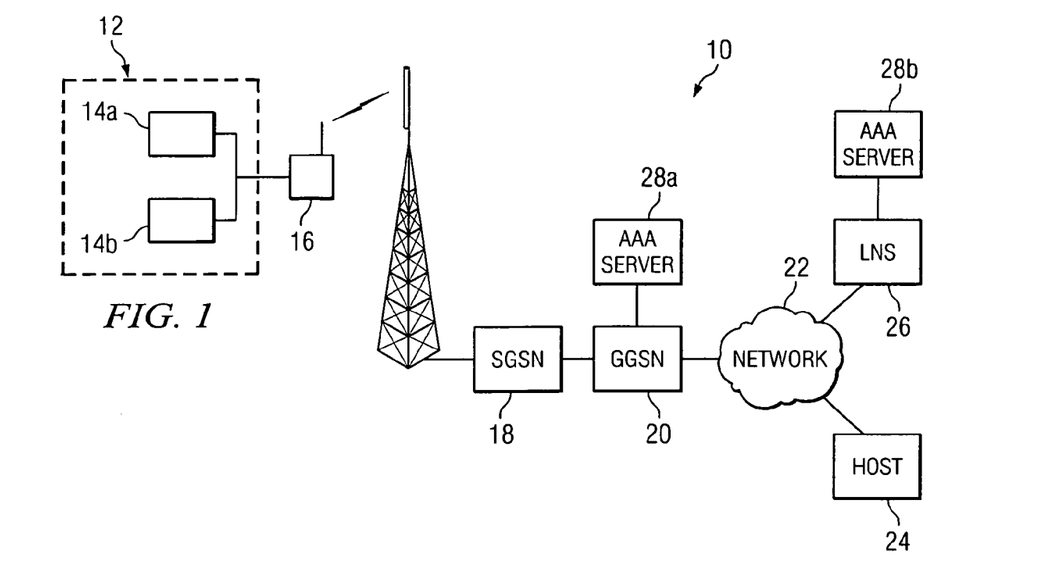
FIG. 1 illustrates a simplified block diagram of a communications system.

FIG. 1 illustrates a communications system, indicated generally at 10, that includes a background network 12, background network devices 14, a wireless station 16, a serving general packet radio service (GPRS) service node (SGSN) 18, a gateway GPRS service node (GGSN) 20, a network 22, host 24, Layer 2 tunneling protocol (L2TP) network server (LNS) 26, and authorization, authentication, and accounting (AAA) servers 28. In general, elements of system 10 support communications transmitted to and from background network 12. More specifically, wireless station 16 may be associated with background network devices 14 to provide for proper authentication of communications sessions involving background network 12 and proper routing and security of packets associated with background network 12.

Background network 12 represents any suitable collection and arrangement of background network devices 14, including components capable of interconnecting background network devices 14. For example, in some embodiments background network 12 may include a local area network (LAN), a wide area network (WAN), some or all of a public switched telephone network (PSTN), and/or one or more private enterprise networks. Note that background network 12 is labeled "background" because background network 12 exists behind wireless station 16.

Background network devices 14 each represent hardware, including appropriate controlling logic, capable of coupling to wireless station 16. For example, in some embodiments background network devices 14 may be computing devices capable of coupling to wireless station 16 using wireless or wireline communication protocols. Thus, background network devices 14 may include any network elements capable of transmitting information with remote devices beyond wireless station 16. Background network devices 14 are labeled "background" because background network devices 14 exist behind wireless station 16.

Wireless station 16 represents hardware and/or appropriate controlling logic capable of communicating with a wireless communications network. For example, in some embodiments wireless station 16 communicates with remote devices using GPRS protocols. Wireless station 16 may also couple background network 12 with the wireless communications network. For instance, wireless station 16 may register with GGSN 20 and indicate background network devices 14 associated with wireless station 16 during registration. Wireless station 16 may also transmit data packets to and receive data packets from background network devices 14 using wireless or wireline communications. Wireless station 16 may be any mobile or stationary device utilizing, at least in part, wireless technology.

SGSN 18 and GGSN 20 each represent hardware, including appropriate controlling logic, capable of facilitating communications sessions involving wireless station 16. Note that while one SGSN 18 and one GGSN 20 have been illustrated for simplicity in explanation, multiple SGSNs 18 and GGSNs and may be used in any particular embodiment. For example, in some embodiments GGSN 20 may work in conjunction with one or more SGSNs 22 to provide a GPRS service network environment. Furthermore, GGSN 20 may encapsulate data packets or remove encapsulation from data packets when forwarding the packets from SGSN 18 to network 22 and vice versa. GPRS represents a packet-based data transport service for communication services that may be delivered as a network overlay for any type of suitable network configuration or platform. GPRS generally applies packet-switching principles to transfer data packets between global system for mobile (GSM) communications elements and external packet-based data networks. Thus, as illustrated, SGSN 18 and GGSN 20 may couple wireless station 16 to network 22. Note, however, that while GPRS is referred to herein, the present invention may be applied to any appropriate networking protocol. Furthermore, protocols used may include one or more of point-to-point protocol (PPP), internet protocol (IP), L2TP, and other appropriate protocols.

Network 22 represents any suitable collection and arrangement of components capable of interconnecting communications equipment. For example, in some embodiments network 22 may encompass some or all of computer networks such as the Internet, the PSTN, and/or private enterprise networks. Furthermore, network 22 may include one or more LANs and/or WANs. Thus, as illustrated, network 22 may interconnect GGSN 20 with host 24 and/or LNS 26.

Host 24 and LNS 26 each represent hardware, including appropriate controlling logic, capable of coupling to network 22 to provide data and/or services to network elements. For example, in some embodiments host 24 and LNS 26 may couple to network 22 to provide access to one or more hosted Web sites. For example, LNS 26 may represent a server hosting the Web site cisco.com. Communications with LNS 26 may involve L2TP, while communications with host 24 may involve IP.

AAA servers 28 each represent hardware, including appropriate controlling logic capable of storing and communicating information related to background network 12. For example, as illustrated AAA server 28a couples to GGSN 20 to provide GGSN 20 with information relating to background network devices 14, and AAA server 28b couples to LNS 26 to provide LNS 26 with information relating to background network devices 14. AAA servers 28 may conform use one of various protocols, including remote authentication dial-in user service (RADIUS).

In operation, various network elements operate independently and/or collaboratively to support communications sessions involving communications to or from background network 12. AAA servers 28 may store information associating background network devices 14 with wireless station 16. Using the information stored by AAA servers 28, GGSN 20 and/or LNS 26 may associate background network devices 14 with wireless station 16 during authentication of communications sessions or at any other time. GGSN 20 and/or LNS 26 may use the information stored by AAA servers 28 to authenticate requests for communications sessions, to route packets intended for background network devices 14, and/or to provide for security of packet delivery within system 10.

AAA servers 28 may accumulate and store information for use by GGSN 20 and/or LNS 26 for authentication, routing, and/or security purposes. Information related to background network 12 may be inputted by an operator into a user attribute table in AAA server 28. For example, network addresses associated with background network devices 14 may be entered as an attribute associated with wireless station 16. Note that network addresses may be public or private network addresses. Furthermore, entered information may be associated with wireless station 16 in various ways. For example, network addresses associated with background network devices 14 may be associated with a network address of wireless station 16. However, since the network address of wireless station 16 may only be assigned at the time wireless station 16 requests a communications session with GGSN 20, for example using dynamic host configuration protocol (DHCP), in some embodiments network addresses of background network devices 14 may be associated with user identifications or other appropriate information identifying wireless station 16. AAA servers 28 may make the information available to GGSN 20 and/or LNS 26.

Various network nodes may authenticate a communications session. Upon receiving a request for a communications session from wireless station 16, GGSN 20 and/or LNS 26 may authenticate the communications session. For example, GGSN 20 and/or LNS 26 may determine whether to establish a requested communications session based on information stored by AAA servers 28. During authentication, GGSN 20 may request AAA server 28a to identify whether wireless station 16 is associated with any background network devices 14. If AAA server 28a identifies that wireless station 16 is associated with background network devices 14, GGSN 20 may establish the requested communications session and associate wireless station 16 with background network devices 14. Similarly, for PPP over a L2TP session, during authentication LNS 26 may request AAA server 28b to identify whether wireless station 16 is associated with any background network devices 14. If AAA server 28b identifies that wireless station 16 is associated with background network devices 14, LNS 26 may establish the requested communications session and associate wireless station 16 with background network devices 14. GGSN 20 and/or LNS 26 may also use the information obtained from AAA servers 28 to route packets and/or provide security of packets communicated in the established communication sessions. In some embodiments, after the end of the communications session, the association of wireless station 16 with background network devices 14 may be deleted or otherwise purged from GGSN 20 and/or LNS 26.

Different network elements may authenticate communications sessions at different times. GGSN 20 may always authenticate communications sessions. Alternatively, GGSN 20 may authenticate certain communications sessions and allow LNS 26 to authenticate other communications sessions. For example, GGSN 20 may only authenticate communications sessions associated with remote endpoints, such as host 24, that will not or cannot authenticate communications sessions independent of GGSN 20. Note that when authentication is conducted by LNS 26 and not be GGSN 20, a mapping table may be used by GGSN 20 to forward packets through tunnels having different tunnel identifications. For example, between wireless station 16 and GGSN 20, one protocol may be used to transport data packets while a second protocol may be used between GGSN 20 and remote endpoints, such as host 24 and/or LNS 26. As mentioned above, GGSN 20 may encapsulate or remove encapsulation of data packets when forwarding the packets from SGSN 18 to network 22 and vice versa. Thus, different tunnels and tunnel identifications may be used. However, one tunnel may be mapped to another tunnel using a mapping table. Thus, when a packet is received, that packet may be forwarded from one tunnel to its matching tunnel using the mapping table. Using tunnel mapping, GGSN 20 does not necessarily need to associate wireless station 16 with background network devices 14. In a particular embodiment, a tunnel using IP may be established between wireless station 16 and GGSN 20, while a tunnel using L2TP may be established between GGSN 20 and LNS 26. A mapping table may be used to associate the IP tunnel with the L2TP tunnel.

Various network nodes may provide security for packet delivery within a communications session. GGSN 20 and/or LNS 26 may provide for security of packet delivery between elements of system 10. Providing security for packet delivery may include verifying network addresses and other identifiers associated with each packet before forwarding the packet or allowing the packet to continue to its destination. For example, GGSN 20 and/or LNS 26 may only communicate packets to wireless station 16 and/or network 22 after analyzing network addresses included in the packets to determine whether the packets correctly identify network addresses associated with wireless station 16. GGSN 20 and/or LNS 26 may obtain information from AAA servers 28 to associate wireless station 16 with background network devices 14 for purposes of packet security. For example, a source or destination network address included in a packet communicated from wireless station 16 may be required to match a network address downloaded from AAA server 28a before GGSN 20 will forward the packet. GGSN 20 and/or LNS 26 may obtain the information used to secure packet delivery from AAA servers 28 during authentication of the communication session. Alternatively, for example when GGSN 20 does not authenticate a communication session and instead only maps packets from one tunnel to another, GGSN 20 may obtain the information from AAA server 28a when it determines to or is commanded to provide packet security.

GGSN 20 and/or LNS 26 may input the information received from AAA servers 28 into various local databases. For example, network addresses associated with background network devices 14 may be entered into a routing table and/or a tunnel security table. When communications are received at GGSN 20, a network address associated with the communication may be compared with the routing table to identify whether to forward the communication to wireless station 16. For example, a packet may identify the network address of background network device 14a, and GGSN 20 may correctly route the packet to wireless station 16 based on the information in the routing table. Alternatively, or in addition, a tunnel identification and a network address associated with the communication may be compared with the tunnel security table to identify whether the included network address is correctly associated with the included tunnel identification. For instance, when GGSN 20 receives a packet from SGSN 18, GGSN 20 may drop the packet if the packet identifies a tunnel identification not associated with the network address included in the packet. In this way, GGSN 20 may detect packets that spoof network addresses of background network devices 14 but indicate an incorrect tunnel identification. Conversely, GGSN 20 may drop the packet if the packet identifies a network address not associated with the tunnel identification identified by the communication. In this way, GGSN 20 may detect packets that spoof tunnel identifications but indicate incorrect network addresses.

Thus, various elements of system 10 may support communications to and from background network 12. Furthermore, various data structures may be stored by the various elements to enable efficient and secure communication of data packets associated with particular background network devices 14.

Figure 2:
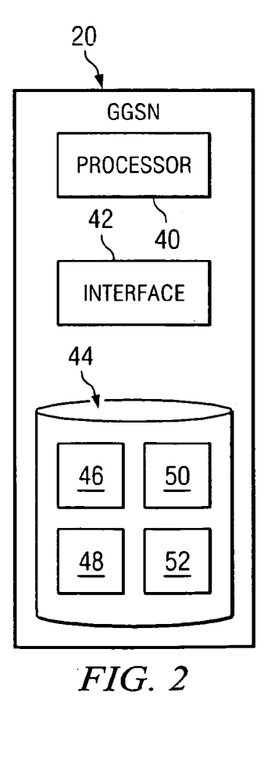
FIG. 2 is a block diagram illustrating exemplary functional components of a gateway GPRS service node (GGSN)

FIG. 2 is a block diagram illustrating exemplary functional components of GGSN 20, including a processor 40, an interface 42, and a memory 44. These elements may operate to support communication with background network 12. More specifically, the elements illustrated may provide for authenticating communications sessions and securing data packet transfers using information obtained from AAA server 28a, and may provide for proper routing of packets by network address and/or tunnel identification.

Processor 40 represents any suitable combination of hardware and/or controlling logic capable of managing and controlling the operation of GGSN 20. For example, processor 40 may include one or more microprocessors or controllers capable of loading and executing software applications to perform various functions.

Interface 42 represents hardware, including any appropriate controlling logic, for linking to and interacting with other elements of system 10. To enable this interaction, interface 42 may encompass any suitable number and types of communication links capable of communicating using appropriate protocols. As illustrated in FIG. 1, GGSN 20 may provide a link between SGSN 18 and network 22. Thus, for example, interface 42 may couple background network device 14a behind wireless station 16 and SGSN 18 with LNS 26 and/or host 24 beyond network 22. GGSN 20 may thus authenticate and secure network traffic, including network packets, passing through GGSN 20. Interface 42 may also transmit and receive information from AAA server 28 and/or receive information from an operator of GGSN 20.

In the embodiment illustrated, memory 44 maintains code database 46, routing database 48, tunnel security database 50, and mapping database 52. However, while memory 44 as illustrated includes particular data elements, it should be understood that memory 44 may maintain any suitable information for use in operation of GGSN 20. Code database 26 includes software, executable files, and/or appropriate logic modules capable, when executed, to control the operation of GGSN 20. For example, code database 46 may include executable files capable of supporting communications with background network 12. Routing database 48 includes one or more routing tables that associate network addresses of background network devices with network addresses of wireless stations. For example, data packets intended for background network devices 14 may include network addresses of background network devices 14. GGSN 20 may perform a lookup operation to identify the network address of wireless station 16 associated with the network addresses of background network devices 14 using a routing table. The network address of wireless station 16 may then be used to route the packet to the correct destination. Similarly, a lookup operation may be used to provide security for communications with background network devices 14. Tunnel security database 50 includes one or more tunnel security tables that associate network addresses with tunnel identifications. For example, a particular tunnel security table may identify network addresses of background network devices 14 associated with a tunnel created between GGSN 20 and wireless station 16. Mapping database 52 includes one or more mapping tables that map tunnel identifications to one another. For example, a tunnel identification associated with a communications session established between GGSN 20 and wireless station 16 may be mapped to a tunnel identification associated with a tunnel between GGSN 20 and a remote device, such as LNS 26.

In operation, interface 42 may receive and transmit packets communicated between SGSN 18 and network 22. Processor 40 may execute instructions found in code database 46 to authenticate communications sessions and secure packets passing through GGSN 20. For example, processor 40 may execute instructions in code database 46 to obtain network addresses associated with wireless station 16, including network addresses of background network devices 14, from AAA server 28a. Using this information, processor 40 may update routing database 48 and/or tunnel security database 50. Thereafter, processor 40 may execute instructions in code database 46 to analyze received packets to determine whether to pass or drop packets using a routing table found in routing database 48 and/or a tunnel security table found in tunnel security database 50. If GGSN 20 determines that packets will be authenticated by a downstream network node, processor 40 may execute instructions found in code database 46 to map packets from one tunnel identification to another using a mapping table found in mapping database 52 without analyzing each packet. However, GGSN 20 may both analyze each packet for security and map tunnels. For example, GGSN 20 may execute instructions in code database 46 at a time other than during authorization to obtain network addresses associated with wireless station 16, including network addresses of background network devices 14, from AAA server 28a.

Note that while the preceding description focuses on a particular embodiment of GGSN 20 that includes specific elements, system 10 contemplates GGSN 20 having any suitable arrangement of elements for supporting background network 12. Therefore, the modules and functionalities described may be separated or combined as appropriate, and some or all of the functionalities of GGSN 20 may be performed by logic encoded in media, such as software and/or programmed logic devices. Also, some or all of the functions of GGSN 20 may be incorporated within other elements of system 10. Furthermore, only particular elements of GGSN 20 are illustrated, and it should be understood that GGSN 20 may include any number and type of elements for performing various wireless networking functions.

Figure 3:
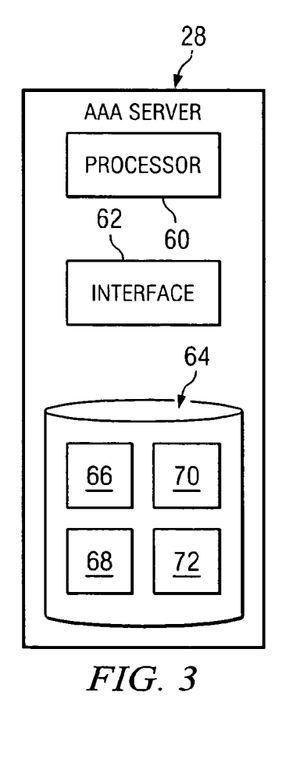
FIG. 3 is a block diagram illustrating exemplary functional components of a server.

FIG. 3 is a block diagram illustrating exemplary functional components of AAA server 28, including a processor 60, an interface 62, and a memory 64. These elements may operate to provide information to GGSN 20 and/or LNS 26 for supporting background network 12, authorizing communications sessions with background network devices 14, securing communications within system 10, and routing packets appropriately.

Processor 60 represents any suitable combination of hardware and/or controlling logic capable of managing and controlling the operation of AAA server 28. For example, processor 60 may include one or more microprocessors or controllers capable of loading and executing software applications to perform various functions.

Interface 62 represents hardware, including any appropriate controlling logic, for linking to and interacting with other elements of system 10. To enable this interaction, interface 62 may encompass any suitable number and types of communication links capable of communicating using appropriate protocols. As illustrated in FIG. 1, AAA server 28 may link to GGSN 20 and/or LNS 26. Thus, interface 62 may transmit and receive communications and information to and from GGSN 20 and/or LNS 26. Interface 42 may also transmit and receive information from an operator of AAA server 28.

In the embodiment illustrated, memory 64 maintains code database 66 and user attribute database 68. However, while memory 64 as illustrated includes particular data elements, it should be understood that memory 64 may maintain any suitable information for use in operation of AAA server 28. Code database 66 includes software, executable files, and/or appropriate logic modules capable, when executed, to control the operation of AAA server 28. For example, code database 66 may include executable files capable of communicating user attribute information to GGSN 20. User attribute database 68 includes one or more user attribute tables identifying network addresses associated with users of the GPRS network, including wireless station 16. For example, attribute database 68 may include a user attribute table associating the network address of wireless station 16 with network addresses of background network devices 14. However, note that information related to background network 12 may be stored in any appropriate standard attributes.

In operation, AAA server 28 may store information related to background network 12 for use by GGSN 20 and/or LNS 26. An operator may input information regarding background network 12 to AAA server 28 through interface 62 to be stored in user attribute database 68. Thereafter, AAA server 28 may receive a request through interface 62 from GGSN 20 or LNS 26 to supply information regarding background network 12. Processor 60 may execute instructions found in code database 66 to obtain the requested information from user attribute database 68 and communicate the information to the requesting network node through network interface 62.

Note that while the preceding description focuses on a particular embodiment of AAA server 28 that includes specific elements, system 10 contemplates AAA server 28 having any suitable combination and arrangement of elements for storing and providing information regarding background network 12. Therefore, the modules and functionalities described may be separated or combined as appropriate, and some or all of the functionalities of AAA server 28 may be performed by logic encoded in media, such as software and/or programmed logic devices. Also some or all of the functions of AAA server 28 may be incorporated within other elements of system 10. Furthermore, only particular elements of AAA server 28 are illustrated, and it should be understood that AAA server 28 may include any number and type of elements for storing and providing information related to background network 12.

FIGS. 4a-4d illustrate exemplary data structures that may be used by GGSN 20 and/or AAA server 28. While specific network addresses and tunnel identifications have been illustrated, note that any appropriate values may be used. User attribute table 80 associates background network devices 14 with users of the GPRS network. As illustrated, user attribute table 80 associates network addresses of wireless stations, such as wireless station 16, with network addresses of background network devices, such as background network devices 14. Note that network addresses may be permanently associated with a wireless station or may be dynamically allocated. Thus, if a permanent or dynamically allocated network address of wireless station 16 is 9.9.7.8, user attribute table 80 indicates that network addresses of background network devices 14*a* and 14*b* are 2.6.8.1, and 4.7.3.5.

Figure 4A:
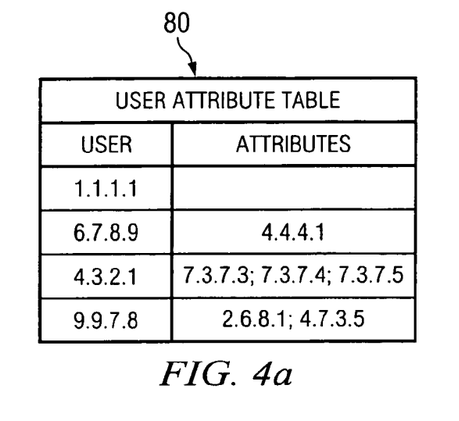
FIGS. 4a-4d illustrate exemplary data structures that may be utilized by various network nodes.

An operator may input the information stored by user attribute table 80 into AAA servers 28. Alternatively, or in addition, one or more wireless stations may communicate information to GGSN 20 for uploading to AAA server 28. Furthermore, AAA servers 28 may accumulate information from various wireless stations 16. The information stored in user attribute table 80 may be communicated to GGSN 20 and/or LNS 26 for authentication, packet security, and other purposes.

Figure 4B:
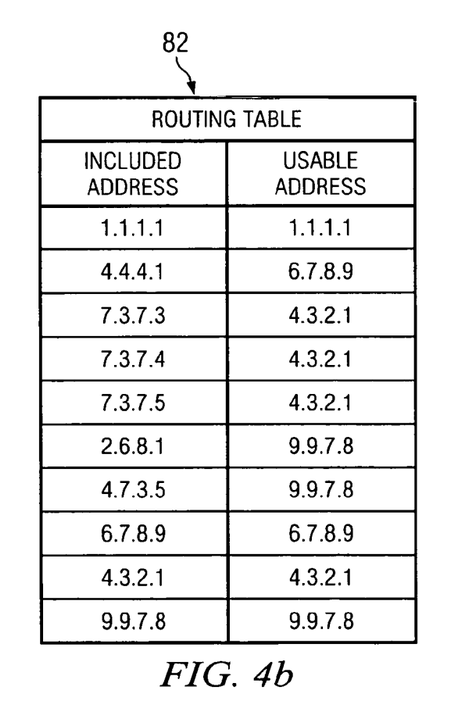

Routing table 82 indicates proper routing of packets that include network addresses. For example, GGSN 20 and/or LNS 26 may store routing table 82 and update routing table 82 periodically using information obtained from AAA servers 28 and user attribute table 80. In some embodiments, routing table 82 is only updated when a communications session is being established or when a communications session has terminated. For example, information may be added to routing table 82 when the communications session is established, and the information may be deleted from routing table 82 when the communications session has terminated. However, routing table 82 may be updated at any appropriate time, such as when a determination is made to analyze packets for security purposes.

Routing table 82 may be used to route packets, provide for security of packets, and authenticate communications session including background network devices 14. For example, when a particular packet includes a network address of wireless station 16 or one of background network devices 14, routing table 82 may indicate an address that may be used to route the packet. For instance, as illustrated, routing table 82 indicates to route packets including network address 2.6.8.1, which may be associated with background network device 14*a*, to network address 9.9.7.8, which may be the network address of wireless station 16. Thus, because network address 2.6.8.1 is included in routing table 82, GGSN 20 and/or LNS 26 may communicate packets identifying network address 2.6.8.1 to the device at 9.9.7.8.

Figure 4C:
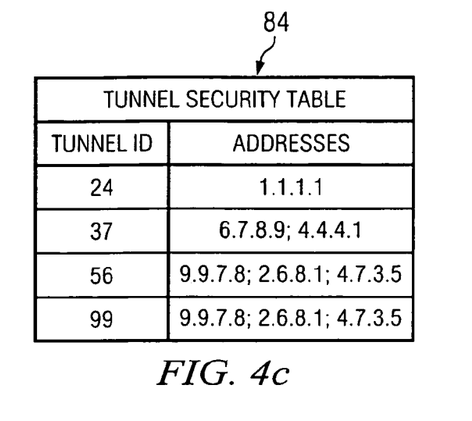

Tunnel security table 84 associates network addresses with tunnel identifications. Tunnel security table 84 may be used by GGSN 20 and/or LNS 26 to verify network addresses included in packets communicated through a particular tunnel and/or to verify tunnel identifications associated with network addresses. For example, if GGSN 20 and/or LNS 26 receives a packet identifying tunnel 56 and network address 4.7.3.5, the packet should be allowed to pass since tunnel security table 84 indicates this is an acceptable combination. However, if GGSN 20 and/or LNS 26 receives a packet identifying tunnel 24 and network address 4.7.3.5, the packet should not be allowed to pass since tunnel security table 84 indicates this is not an acceptable combination. Similarly, if GGSN 20 and/or LNS 26 receives a packet identifying tunnel 56 and network address 1.1.1.1, the packet should not be allowed to pass since tunnel security table 84 indicates this is not an acceptable combination.

Figure 4D:
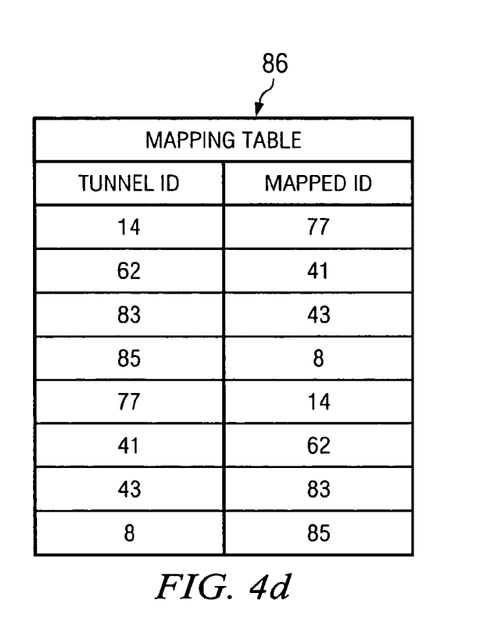

Mapping table 86 maps tunnel identifications. Mapping table 86 may be used by GGSN 20, for example, when GGSN 20 does not authenticate a communication session passing through GGSN 20. For example, GGSN 20 may utilize mapping table 86 when a communications session is established between wireless station 16 and LNS 26. GGSN 20 may simply map tunnel identifications and forward packets from one tunnel to the next if authentication is to be performed by LNS 26. However, even if LNS 26 may authenticate packets, GGSN 20 may also provide security by analyzing packets using information obtained from AAA server 28*a*.

Figure 5:
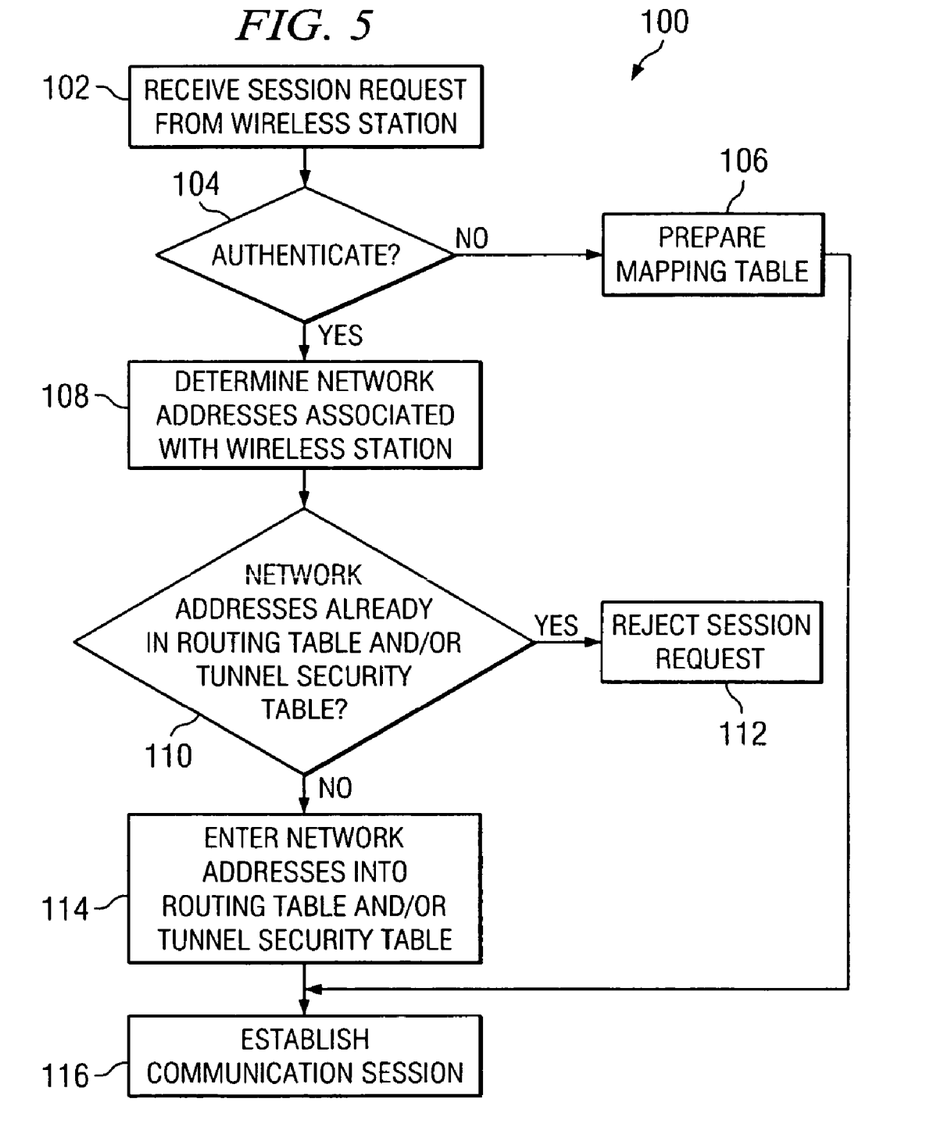
FIG. 5 is a flowchart illustrating a method for establishing a communications session involving a network behind a wireless station.

FIG. 5 illustrates a method 100 for establishing a communications session with wireless station 16. GGSN 20 receives a session request from wireless station 16 at step 102. For example, wireless station 16 may communicate a packet through SGSN 18 to GGSN 20 requesting initiation of a communications session with a remote device. GGSN 20 determines whether to authenticate the requested communications session at step 104. When a determination is made not to authenticate the communications session, GGSN 20 may prepare a mapping table at step 106. For example, when an L2TP tunnel is established with LNS 26, GGSN 20 may prepare a mapping table for the L2TP tunnel. As discussed above, a mapping table, such as mapping table 86, may be used to map packets from one tunnel to a related tunnel using tunnel identifications. When the communications session is not authenticated by GGSN 20, the mapping table may be used to forward packets received during the communications session. Thus, after preparing the mapping table at step 106, GGSN 20 establishes the communications session at step 116.

On the other hand, when a determination is made that GGSN 20 will authenticate the communications session, GGSN 20 may determine network addresses associated with wireless station 16 at step 108. GGSN 20 may identify a network address of wireless station 16. The network address of wireless station 16 may be permanent, or the network address may be dynamically allocated using DHCP. GGSN 20 may also determine network addresses of any background network devices 14 associated with wireless station 16. Information related to background network 12, including background network devices 14, may be stored in a user attribute table stored by AAA server 28*a*. Thus, GGSN 20 may communicate with AAA server 28*a* to obtain the network addresses associated with wireless station 16.

At step 110, GGSN 20 determines whether the network addresses associated with background network 12 already exist in a routing table or tunnel security table stored by GGSN 20. In other words, GGSN 20 determines whether any one of the network addresses associated with background network devices 14 is already included in a table as being associated with a different wireless station 16. The session request is rejected at step 112 if the network address would be duplicated by entering the network address into a table. If the network addresses would not be duplicated, the network addresses associated with wireless station 16 are entered into appropriate tables at step 114. As indicated, the network addresses may be entered into the routing table. The network addresses may also be entered into the tunnel security table. Thus, GGSN 20 may use the information obtained from AAA server 28*a* to update appropriate databases such as routing database 48 and/or tunnel security database 50 during authentication. Using these steps, GGSN 20 prepares to authenticate and otherwise secure communications associated with the communications session before establishing the communications session at step 116.

Thus, method 100 illustrates steps GGSN 20 may take to establish a communications session. More specifically, GGSN 20 may take appropriate steps to prepare to receive packets associated with a communications session. GGSN 20 may authenticate the communication session, or may prepare to forward packets without authentication. While focusing on GGSN 20, note that various aspects of method 100, and in particular authentication of a session request, may be performed by LNS 26.

Figure 6:
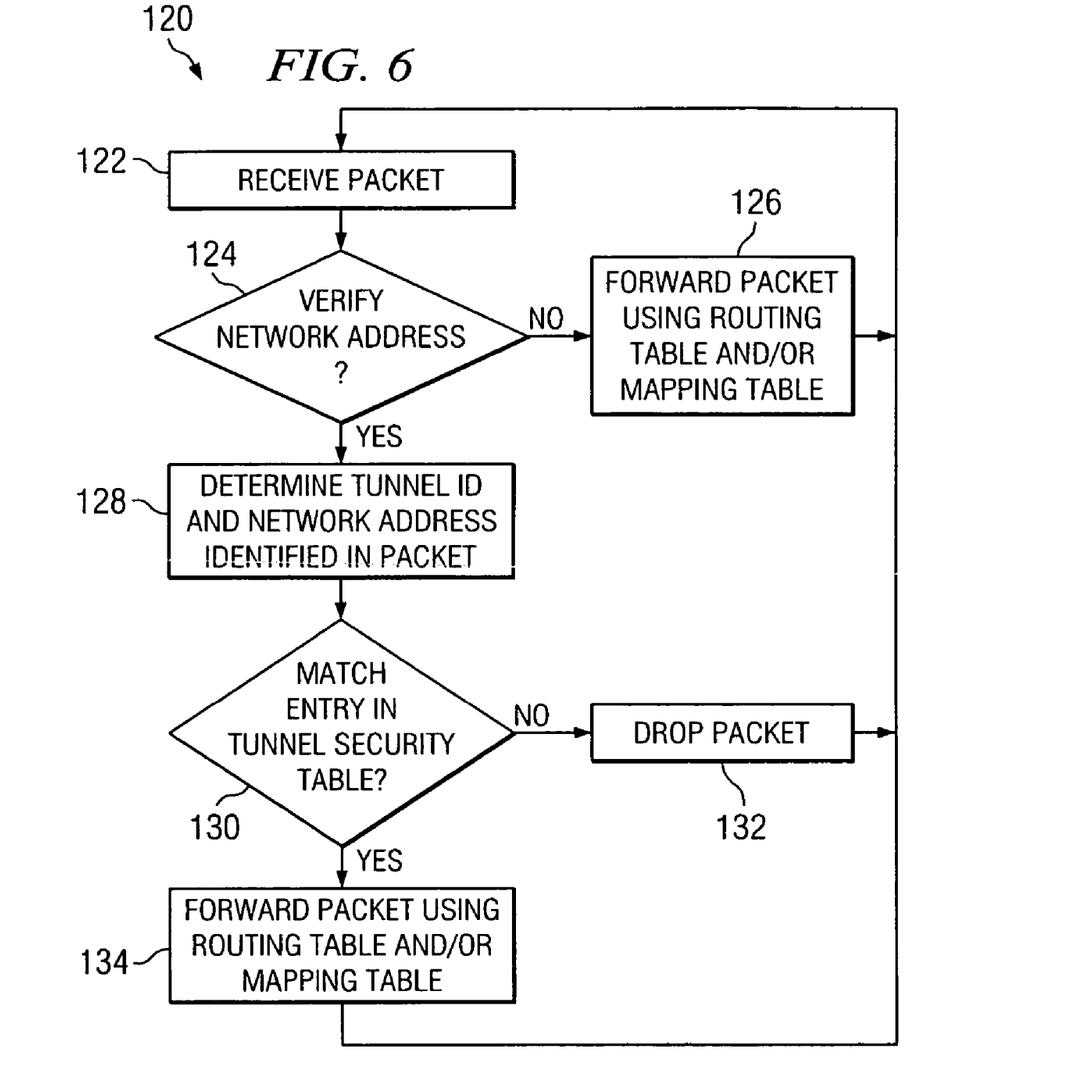
FIG. 6 is a flowchart illustrating a method for handling packets associated with a network behind a wireless station.

FIG. 6 illustrates a method 120 for securing packets associated with a communications session. Note that method 120 may be performed by GGSN 20, LNS 26, or any other appropriate device. However, for simplicity in explanation, method 120 will be discussed in relation to performance by GGSN 20.

GGSN 20 receives a packet at step 122. GGSN 20 determines whether to verify network addresses identified in the packet at step 124. The network addresses may be source addresses or destination addresses. For example, GGSN 20 may determine that the packet is associated with a communications session requiring secure packet delivery. If GGSN 20 determines not to verify network addresses identified in the packet, GGSN 20 may forward the packet to its identified destination using a routing or mapping table at step 126. On the other hand, if GGSN 20 determines to verify the included network addresses, GGSN 20 determines a tunnel identification and a network address identified in the packet at step 128. GGSN 20 determines whether the included tunnel identification and network address match an entry in tunnel security table and/or other appropriate data structures at step 130. If the included information does not match an entry in the tunnel security table, the packet is dropped at step 132. On the other hand, if the included information matches an entry in the tunnel security table, the packet is forwarded to its destination using the routing table at step 134. Thus, method 120 illustrates one technique for providing security of packet delivery within system 10.

While the preceding flowcharts illustrate particular methods for appropriate elements of system 10 to support background network 12, these flowcharts illustrate only exemplary methods of operation, and system 10 contemplates appropriate elements using any suitable techniques, components, and applications for performing similar techniques. Thus, many of the steps in these flowcharts may take place simultaneously and/or in different orders than as shown. In addition, appropriate elements within system 10 may use methods with additional, fewer, and/or different steps, so long as the methods remain appropriate.

Thus, it is apparent that there has been provided, in accordance with the present invention, a system, apparatus, and method for supporting a background network that satisfies the advantages set forth above. Although the present invention has been described in detail, it should be understood that various changes, substitutions, and alterations may be readily ascertainable by those skilled in the art and may be made herein without departing from the spirit and scope of the present invention as defined in the following claims. Moreover, the present invention is not intended to be limited in any way by any statement made herein that is not otherwise reflected in the following claims.

What is claimed is:

1. An apparatus for supporting a network behind a wireless station, comprising:
   a gateway operable to:
   receive from a wireless station a request for a communications session,
   determine whether to authenticate the communications session,
   to request network addresses from an authentication server for network devices behind the wireless station in response to determining to authenticate the communications session,
   receive the requested network addresses from the authentication server,
   associate the received network addresses with the wireless station,
   establish a first tunnel and tunnel identifier for the communications session with the wireless station,
   establish a second tunnel and a tunnel identifier with a destination server associated with the request,
   associate the received network addresses with the first tunnel and tunnel identifier,
   associate the first tunnel and tunnel identifier with the second tunnel and tunnel identifier.

2. The apparatus of claim 1, wherein associating the received network addresses with the wireless station comprises:
   determining a network address of the wireless station;
   associating each received network address with the network address of the wireless station.

3. The apparatus of claim 1, wherein the gateway is further operable to:
   receive from the wireless station a message, the message having a source address, a tunnel identifier, and a destination address;
   determine whether the source address matches any one of the received network addresses or a network address of the wireless station;
   determine whether the tunnel identifier in the message matches the tunnel identifier for the tunnel of the communication session;
   drop the message in response to either determining that the source address does not match any one of the received network addresses or the network address of the wireless station or the tunnel identifier in the message does not match the tunnel identifier for the tunnel;
   forward the message to the destination address in response to determining that both the source address matches one of the received network addresses or the network address of the wireless station and the tunnel identifier in the message matches the tunnel identifier of the tunnel.

4. The apparatus of claim 1, wherein the gateway is further operable to:
   receive from the destination server a message having a destination address and a tunnel identifier;
   determine whether the destination address matches any one of the received network addresses or a network address of the wireless station;
   determine whether the tunnel identifier in the message matches the tunnel identifier for the tunnel of the communication session;
   drop the message in response to either determining that the destination address does not match any one of the received network addresses or a network address of the wireless station or the tunnel identifier in the message does not match the tunnel identifier for the tunnel;
   forward the message to the wireless station in response to determining that both the destination address matches one of the received network addresses or the network address of the wireless station and the tunnel identifier in the message matches the tunnel identifier of the tunnel.

5. The apparatus of claim 1, wherein the gateway is further operable to:
  determine whether any one of the received network addresses is already associated with a second wireless station;
  associate the received network addresses with the wireless station in response to determining that none of the received network addresses is already associated with the second wireless station.

6. The apparatus of claim 1, wherein the gateway is further operable to:
  in response to determining not to authenticate the communications session:
    establish the communications session, the communications session having a first communication link associated with the wireless station and a second communication link associated with the destination server;
    map the first communication link and the second communication link to one another.

7. The apparatus of claim 6, wherein the gateway is further operable to:
  receive from the wireless station a message using the first communication link;
  forward the message to the destination server using the second communication link.

8. The apparatus of claim 6, wherein the gateway is further operable to:
  receive from the destination server a message using the second communication link;
  forward the message to the wireless station using the first communication link.

9. A method for supporting a network behind a wireless station, comprising:
  receiving from a wireless station a request for a communications session;
  determining whether to authenticate the communications session;
  in response to determining to authenticate the communications session:
    requesting, from an authentication server, network addresses for network devices behind the wireless station;
    receiving the requested network addresses from the authentication server;
    associating the received network addresses with the wireless station;
    establishing first tunnel and tunnel identifier for the communications session with the wireless station;
    establish a second tunnel and a tunnel identifier with a destination server associated with the request;
    associate the received network addresses with the first tunnel and tunnel identifier,
    associate the first tunnel and tunnel identifier with the second tunnel and tunnel identifier.

10. The method of claim 9, wherein associating the received network addresses with the wireless station comprises:
  determining a network address of the wireless station;
  associating each received network address with the network address of the wireless station.

11. The method of claim 9, further comprising:
  receiving from the wireless station a message, the message having a source address, a tunnel identifier, and a destination address;
  determining whether the source address matches any one of the received network addresses or a network address of the wireless station;
  determining whether the tunnel identifier in the message matches the tunnel identifier for the tunnel of the communication session;
  dropping the message in response to either determining that the source address does not match any one of the received network addresses or the network address of the wireless station or the tunnel identifier in the message does not match the tunnel identifier for the tunnel;
  forwarding the message to the destination address in response to determining that both the source address matches one of the received network addresses or the network address of the wireless station and the tunnel identifier in the message matches the tunnel identifier of the tunnel.

12. The method of claim 9, further comprising:
  receiving from the destination server a message having a destination address and a tunnel identifier;
  determining whether the destination address matches any one of the received network addresses or a network address of the wireless station;
  determining whether the tunnel identifier in the message matches the tunnel identifier for the tunnel of the communication session;
  dropping the message in response to either determining that the destination address does not match any one of the received network addresses or a network address of the wireless station or the tunnel identifier in the message does not match the tunnel identifier for the tunnel;
  forwarding the message to the wireless station in response to determining that both the destination address matches one of the received network addresses or the network address of the wireless station and the tunnel identifier in the message matches the tunnel identifier of the tunnel.

13. The method of claim 9, further comprising:
  determining whether any one of the received network addresses is already associated with a second wireless station;
  associating the received network addresses with the wireless station in response to determining that none of the received network addresses is already associated with the second wireless station.

14. The method of claim 9, further comprising:
  in response to determining not to authenticate the communications session:
    establishing the communications session, the communications session having a first communication link associated with the wireless station and a second communication link associated with the destination server;
    mapping the first communication link and the second communication link to one another.

15. The method of claim 14, further comprising:
  receiving from the wireless station a message using the first communication link;
  forwarding the message to the destination server using the second communication link.

16. The method of claim 14, further comprising:
  receiving from the destination server a message using the second communication link;
  forwarding the message to the wireless station using the first communication link.

17. A system for supporting a network behind a wireless station, comprising:
- an authentication server operable to store a plurality of sets of network addresses, each set associated with a unique wireless station;
- a gateway operable to;
  - receive from a particular wireless station a request for a communications session,
  - determine whether to authenticate the communications session,
  - to request network addresses from the authentication server for network devices behind the particular wireless station in response to determining to authenticate the communications session,
  - receive the requested network addresses from the authentication server,
  - associate the received network addresses with the particular wireless station,
  - establish a first tunnel and tunnel identifier for the communications session with the wireless station
  - establish a second tunnel and a tunnel identifier with a destination server associated with the request,
  - associate the received network addresses with the first tunnel and tunnel identifier,
  - associate the first tunnel and tunnel identifier with the second tunnel and tunnel identifier.

18. The system of claim 17, wherein associating the received network addresses with the particular wireless station comprises:
- determining a network address of the particular wireless station;
- associating each received network address with the network address of the particular wireless station.

19. The system of claim 17, wherein the gateway is further operable to:
- receive from the particular wireless station a message, the message having a source address, a tunnel identifier, and a destination address;
- determine whether the source address matches any one of the received network addresses or a network address of the wireless station;
- determine whether the tunnel identifier in the message matches the tunnel identifier for the tunnel of the communication session;
- drop the message in response to either determining that the source address does not match any one of the received network addresses or the network address of the wireless station or the tunnel identifier in the message does not match the tunnel identifier for the tunnel;
- forward the message to the destination address in response to determining that both the source address matches one of the received network addresses or the network address of the wireless station and the tunnel identifier in the message matches the tunnel identifier of the tunnel.

20. The system of claim 17, wherein the gateway is further operable to:
- receive from the destination server a message having a destination address and a tunnel identifier;
- determine whether the destination address matches any one of the received network addresses or a network address of the wireless station;
- determine whether the tunnel identifier in the message matches the tunnel identifier for the tunnel of the communication session;
- drop the message in response to either determining that the destination address does not match any one of the received network addresses or a network address of the wireless station or the tunnel identifier in the message does not match the tunnel identifier for the tunnel;
- forward the message to the wireless station in response to determining that both the destination address matches one of the received network addresses or the network address of the wireless station and the tunnel identifier in the message matches the tunnel identifier of the tunnel.

21. The system of claim 17, wherein the gateway is further operable to:
- determine whether any one of the received network addresses is already associated with a second wireless station;
- associate the received network addresses with the particular wireless station in response to determining that none of the received network addresses is already associated with the second wireless station.

22. The system of claim 17, wherein the gateway is further operable to:
- in response to determining not to authenticate the communications session:
  - establish the communications session, the communications session having a first communication link associated with the particular wireless station and a second communication link associated with the destination server;
  - map the first communication link and the second communication link to one another.

23. The system of claim 22, wherein the gateway is further operable to:
- receive from the particular wireless station a message using the first communication link;
- forward the message to the destination server using the second communication link.

24. The system of claim 22, wherein the gateway is further operable to:
- receive from the destination server a message using the second communication link;
- forward the message to the particular wireless station using the first communication link.

25. Logic for supporting a network behind a wireless station, the logic encoded in a computer readable medium and operable when executed to:
- receive from a wireless station a request for a communications session;
- determine whether to authenticate the communications session;
- in response to determining to authenticate the communications session:
  - request network addresses from an authentication server for network devices behind the wireless station;
  - receive the requested network addresses from the authentication server;
  - associate the received network addresses with the wireless station;
  - establish a first tunnel and tunnel identifier for the communications session with the wireless station;
  - establish a second tunnel and a tunnel identifier with a destination server associated with the request;
  - associate the received network addresses with the first tunnel and tunnel identifier;
  - associate the first tunnel and tunnel identifier with the second tunnel and tunnel identifier.

26. The logic of claim 25, wherein associating the received network addresses with the wireless station comprises:
  determining a network address of the wireless station;
  associating each received network address with the network address of the wireless station.

27. The logic of claim 25, further operable when executed to:
  receive from the wireless station a message, the message having a source address, a tunnel identifier, and a destination address;
  determine whether the source address matches any one of the received network addresses or a network address of the wireless station;
  determine whether the tunnel identifier in the message matches the tunnel identifier for the tunnel of the communication session;
  drop the message in response to either determining that the source address does not match any one of the received network addresses or the network address of the wireless station or the tunnel identifier in the message does not match the tunnel identifier for the tunnel;
  forward the message to the destination address in response to determining that both the source address matches one of the received network addresses or the network address of the wireless station and the tunnel identifier in the message matches the tunnel identifier of the tunnel.

28. The logic of claim 25, further operable when executed to:
  receive from the destination server a message having a destination address and a tunnel identifier;
  determine whether the destination address matches any one of the received network addresses or a network address of the wireless station;
  determine whether the tunnel identifier in the message matches the tunnel identifier for the tunnel of the communication session;
  drop the message in response to either determining that the destination address does not match any one of the received network addresses or a network address of the wireless station or the tunnel identifier in the message does not match the tunnel identifier for the tunnel;
  forward the message to the wireless station in response to determining that both the destination address matches one of the received network addresses or the network address of the wireless station and the tunnel identifier in the message matches the tunnel identifier of the tunnel.

29. The logic of claim 25, further operable when executed to:
  determine whether any one of the received network addresses is already associated with a second wireless station;
  associate the received network addresses with the wireless station in response to determining that none of the received network addresses is already associated with the second wireless station.

30. The logic of claim 25, further operable when executed to:
  in response to determining not to authenticate the communications session:
    establish the communications session, the communications session having a first communication link associated with the wireless station and a second communication link associated with the destination server;
    map the first communication link and the second communication link to one another.

31. The logic of claim 30, further operable when executed to:
  receive from the wireless station a message using the first communication link;
  forward the message to the destination server using the second communication link.

32. The logic of claim 30, further operable when executed to:
  receive from the destination server a message using the second communication link;
  forward the message to the wireless station using the first communication link.

33. An apparatus for supporting a network behind a wireless station, comprising:
  means for receiving from a wireless station a request for a communications session;
  means for determining whether to authenticate the communications session;
  in response to determining to authenticate the communications session:
    means for requesting, from an authentication server, network addresses for network devices behind the wireless station;
    means for receiving the requested network addresses from the authentication server;
    means for associating the received network addresses with the wireless station;
    means for establishing a first tunnel and tunnel identifier for the communications session with the wireless station;
    means for establishing a second tunnel and a tunnel identifier with a destination server associated with the request:
    means for associating the received network addresses with the first tunnel and tunnel identifier;
    means for associating the first tunnel and tunnel identifier with the second tunnel and tunnel identifier.

34. The apparatus of claim 33, wherein the means for associating the received network addresses with the wireless station comprises:
  means for determining a network address of the wireless station;
  means for associating each received network address with the network address of the wireless station.

35. The apparatus of claim 33, further comprising:
  means for receiving from the wireless station a message, the message having a source address, a tunnel identifier, and a destination address;
  means for determining whether the source address matches any one of the received network addresses or a network address of the wireless station;
  means for determining whether the tunnel identifier in the message matches the tunnel identifier for the tunnel of the communication session;
  means for dropping the message in response to either determining that the source address does not match any one of the received network addresses or the network address of the wireless station or the tunnel identifier in the message does not match the tunnel identifier for the tunnel;
  means for forwarding the message to the destination address in response to determining that both the source address matches one of the received network addresses or the network address of the wireless station and the tunnel identifier in the message matches the tunnel identifier of the tunnel.

36. The apparatus of claim 33, further comprising:

means for receiving from the destination server a message having a destination address and a tunnel identifier;

means for determining whether the destination address matches any one of the received network addresses or a network address of the wireless station;

means for determining whether the tunnel identifier in the message matches the tunnel identifier for the tunnel of the communication session;

means for dropping the message in response to either determining that the destination address does not match any one of the received network addresses or a network address of the wireless station or the tunnel identifier in the message does not match the tunnel identifier for the tunnel;

means for forwarding the message to the wireless station in response to determining that both the destination address matches one of the received network addresses or the network address of the wireless station and the tunnel identifier in the message matches the tunnel identifier of the tunnel.

37. The apparatus of claim 33, further comprising:

means for determining whether any one of the received network addresses is already associated with a second wireless station;

means for associating the received network addresses with the wireless station in response to determining that none of the received network addresses is already associated with the second wireless station.

38. The apparatus of claim 33, further comprising:

in response to determining not to authenticate the communications session:

means for establishing the communications session, the communications session having a first communication link associated with the wireless station and a second communication link associated with the destination server;

means for mapping the first communication link and the second communication link to one another.

39. The apparatus of claim 38, further comprising:

means for receiving from the wireless station a message using the first communication link;

means for forwarding the message to the destination server using the second communication link.

40. The apparatus of claim 38, further comprising:

means for receiving from the destination server a message using the second communication link;

means for forwarding the message to the wireless station using the first communication link.

* * * * *